(12) United States Patent
Kobayashi et al.

(10) Patent No.: US 11,788,974 B2
(45) Date of Patent: Oct. 17, 2023

(54) CONTROL APPARATUS, SYSTEM, METHOD, AND PROGRAM

(71) Applicant: Rigaku Corporation, Akishima (JP)

(72) Inventors: Shintaro Kobayashi, Akishima (JP); Katsuhiko Inaba, Akishima (JP); Hisashi Konaka, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 66 days.

(21) Appl. No.: 17/119,166

(22) Filed: Dec. 11, 2020

(65) Prior Publication Data
US 2021/0181126 A1    Jun. 17, 2021

(30) Foreign Application Priority Data

Dec. 13, 2019 (JP) ................. 2019-225823

(51) Int. Cl.
*G01N 23/20016* (2018.01)
*G01N 23/207* (2018.01)

(52) U.S. Cl.
CPC ..... *G01N 23/20016* (2013.01); *G01N 23/207* (2013.01); *G01N 2223/056* (2013.01); *G01N 2223/303* (2013.01); *G01N 2223/61* (2013.01)

(58) Field of Classification Search
CPC ....... G01N 2223/056; G01N 2223/303; G01N 2223/61; G01N 23/207; G01N 23/20016
See application file for complete search history.

(56) References Cited

U.S. PATENT DOCUMENTS

| 7,035,373 | B2 | 4/2006 | Omote |
| 7,848,489 | B1 * | 12/2010 | He .................. G01N 23/207 |
| | | | 378/81 |
| 9,063,064 | B2 * | 6/2015 | Nomura .......... G01N 23/20025 |
| 11,079,345 | B2 | 8/2021 | Matsushima et al. |

(Continued)

FOREIGN PATENT DOCUMENTS

| JP | 11-287773 A | 10/1999 |
| JP | 2000-338059 A | 12/2000 |

(Continued)

OTHER PUBLICATIONS

Japanese Office Action for Japanese Application No. 2019-225823, dated Dec. 13, 2022, with an English translation.

*Primary Examiner* — Dani Fox
*Assistant Examiner* — Soorena Kefayati
(74) *Attorney, Agent, or Firm* — BIRCH, STEWART, KOLASCH & BIRCH, LLP

(57) ABSTRACT

There is provided a control apparatus 40 that controls a tilt of a sample, the control apparatus comprising an input section 41 that receives an input of inclination information representing inclination of the sample with respect to a ϕ axis; an adjustment amount determination section 43 that determines adjustment amounts of a ω value and a χ value for correcting a deviation amount between a scattering vector and a normal line to a sample surface or a lattice plane with respect to a ϕ value that varies, using the inclination information; and a drive instruction section 47 that drives a goniometer according to ϕ axis rotation of the sample, based on the determined adjustment amounts of the ω value and the χ value, during an X-ray diffraction measurement.

12 Claims, 10 Drawing Sheets

WHEN PERFORMING ΦROTATION (ϕ=0°)

WHEN PERFORMING ΦROTATION (ϕ=180°)

(56) References Cited

U.S. PATENT DOCUMENTS

| | | | |
|---|---|---|---|
| 2004/0190681 A1* | 9/2004 | Omote | G01N 23/20 378/71 |
| 2009/0103680 A1* | 4/2009 | Park | G01N 23/207 378/73 |
| 2010/0046708 A1* | 2/2010 | Suominen | G01N 23/20016 378/81 |
| 2012/0195406 A1* | 8/2012 | Asano | G01N 23/207 378/71 |
| 2013/0336454 A1* | 12/2013 | Nomura | G01N 23/20025 378/79 |
| 2015/0146861 A1* | 5/2015 | Kobayashi | G01N 23/207 378/79 |
| 2015/0146960 A1* | 5/2015 | Sakumura | G01N 23/207 382/132 |
| 2015/0330918 A1* | 11/2015 | Kim | H01L 22/12 378/74 |
| 2015/0346121 A1* | 12/2015 | Giencke | G01B 9/02018 378/74 |
| 2017/0343490 A1* | 11/2017 | He | G01N 23/207 |
| 2017/0363550 A1* | 12/2017 | Kobayashi | G01N 23/20008 |
| 2017/0370860 A1* | 12/2017 | Konaka | G01N 23/20008 |
| 2017/0371047 A1* | 12/2017 | Marui | G01N 23/207 |
| 2018/0052121 A1* | 2/2018 | Osakabe | G01N 23/207 |
| 2018/0372658 A1* | 12/2018 | He | G01N 23/2055 |
| 2021/0003462 A1* | 1/2021 | Okamoto | G01N 23/207 |
| 2021/0063326 A1 | 3/2021 | Matsushima et al. | |

FOREIGN PATENT DOCUMENTS

| | | |
|---|---|---|
| JP | 2004-294136 A | 10/2004 |
| JP | 2007-17273 A | 1/2007 |
| WO | WO 2019/130663 A1 | 7/2019 |

* cited by examiner

WHEN PERFORMING Φ ROTATION ($\phi = 0°$)

WHEN PERFORMING Φ ROTATION ($\phi = 180°$)

| | ADJUSTMENT AMOUNT | | DRIVE CONTROL VALUE | |
|---|---|---|---|---|
| $\phi$ (°) | $\Delta\omega$ (°) | $\Delta\chi$ (°) | $\omega$ (°) | $\chi$ (°) |
| 0 | −0.1781 | 0.0592 | 0.3219 | 0.0592 |
| 15 | −0.1560 | 0.1033 | 0.3434 | 0.1033 |
| 30 | −0.1246 | 0.1403 | 0.3754 | 0.1403 |
| 45 | −0.0840 | 0.1678 | 0.4160 | 0.1678 |
| 60 | −0.0377 | 0.1838 | 0.4623 | 0.1838 |
| 75 | 0.0111 | 0.1873 | 0.5112 | 0.1873 |
| 90 | 0.0592 | 0.1781 | 0.5593 | 0.1781 |
| 105 | 0.1033 | 0.1566 | 0.6033 | 0.1566 |
| 120 | 0.1403 | 0.1246 | 0.6403 | 0.1246 |
| 135 | 0.1678 | 0.0840 | 0.6678 | 0.0840 |
| 150 | 0.1838 | 0.0377 | 0.6838 | 0.0377 |
| 165 | 0.1873 | −0.0111 | 0.6873 | −0.0111 |
| 180 | 0.1780 | −0.0592 | 0.6781 | −0.0592 |
| 195 | 0.1566 | −0.1033 | 0.6567 | −0.1033 |
| 210 | 0.1245 | −0.1403 | 0.6246 | −0.1403 |
| 225 | 0.0840 | −0.1678 | 0.5840 | −0.1678 |
| 240 | 0.0377 | −0.1838 | 0.5377 | −0.1838 |
| 255 | −0.0111 | −0.1873 | 0.4889 | −0.1873 |
| 270 | −0.0592 | −0.1781 | 0.4408 | −0.1781 |
| 285 | −0.1033 | −0.1566 | 0.3967 | −0.1566 |
| 300 | −0.1403 | −0.1246 | 0.3597 | −0.1246 |
| 315 | −0.1678 | −0.0840 | 0.3322 | −0.0840 |
| 330 | −0.1838 | −0.0377 | 0.3162 | −0.0377 |
| 345 | −0.1873 | 0.0111 | 0.3127 | 0.0111 |
| 360 | −0.1781 | 0.0592 | 0.3219 | 0.0592 |

FIG. 8

BEFORE ADJUSTMENT

AFTER ADJUSTMENT

CONTROL APPARATUS, SYSTEM, METHOD, AND PROGRAM

TECHNICAL FIELD

The present invention relates to a control apparatus that controls a tilt of a sample, and to a system, a method and a program thereof.

RELATED ART

A thin film is two-dimensionally formed thin on a substrate surface, and thus anisotropy is generally present in a lamination direction and an in-plane direction. Thus, a structure in the thin film in the lamination direction and the in-plane direction is often evaluated. There are various measuring methods for evaluating the structure in the thin film according to a direction to which attention is paid. For example, an in-plane XRD measurement and a reciprocal space mapping of an asymmetrical plane are carried out, when being evaluated in the in-plane direction.

In order to evaluate a thin film using X-rays, it is necessary to accurately control an incident angle of X-ray. When a sample thickness is thin, a diffraction signal intensity thereof becomes very weak. In order to detect such a very weak signal, irradiation of X-rays incident on a surface efficiently becomes necessary according to the in-plane XRD measurement. Specifically, X-rays are irradiated to be incident very closely on the sample surface. Further, in the reciprocal space mapping, X-rays are made to be accurately incident on the lattice plane in order to specifically measure a material (an epitaxial film) whose lattice plane is highly aligned.

The in-plane rotation of a sample, that is, the rotation of the sample by a $\phi$ axis is necessary in each of the in-plane XRD measurement and the reciprocal space mapping. However, the rotation axis of $\phi$ is not generally identical to a crystal axis of an object sample as well as a sample surface normal just by arranging the sample to an X-ray diffractometer, and thus precession is generated for the crystal axis of the object sample or the sample surface normal with respect to $\phi$ axis rotation. In this case, it is facilitated that an incident angle of X-ray on the sample surface is maintained to be constant by matching the crystal axis or the surface normal line in an object direction to the $\phi$ axis in advance. In order to achieve this, there is provided an inclination movement axis as an axis for adjusting inclination of the sample.

The inclination movement axis that is provided on a $\phi$ rotation axis like a tilt mechanism disclosed, for example, in Patent Document 1 adjusts the inclination of the sample in orthogonal biaxial x and y directions. In this manner, it becomes possible that the crystal axis of the sample or the sample surface normal on the inclination movement axis is made to be identical to the $\phi$ axis by adjusting α swing angle.

FIGS. 10A and 10B are schematic diagrams showing samples S0 before and after adjustment of inclination movement axes (Rx axis, Ry axis), respectively. As shown in FIG. 10A, a normal line n to the surface of the sample S0 before adjustment is tilted from the $\phi$ axis. As shown in FIG. 10B, the normal line n to the sample S0 surface can be made to be identical to the $\phi$ axis by performing adjustment via rotations of the Rx axis and the Ry axis before measurement. Upon X-ray irradiation while performing the $\phi$ axis rotation in this state, the sample S0 can be rotated while maintaining the incident angle of X-rays to the sample surface to be constant. The technique relating to such an inclination movement axis has been disclosed.

For example, Patent Document 2 has disclosed an apparatus provided with a mechanism for rotating the sample (Ru and Rv rotations) around two rotational center lines which are orthogonal to each other and pass on the surface of the sample. This apparatus is also provided with a mechanism for translating the sample in a two-dimensional direction (U- and V-directions) within a plane parallel with the surface as well as a mechanism for performing an in-plane rotation of the sample ($\phi$ rotation).

Further, Patent Document 3 has disclosed a sample support device comprising a base stage, and a mounting stage arranged on the base stage in an overlapped manner. Then, the base stage provided with a $\phi$ axis movement stage where the sample is rotated in-plane can be provided with an X-Y axes moving stage (XY attachment) for moving the sample in an in-plane sliding manner or an Rx-Ry axes moving stage (RxRy attachment) for adjusting a posture of the sample.

Patent Document

[Patent Document 1] Japanese Unexamined Patent Application Publication No. H11-287773
[Patent Document 2] Japanese Unexamined Patent Application Publication No. 2004-294136
[Patent Document 3] Japanese Unexamined Patent Application Publication No. 2007-017273

In an X-ray diffractometer, a space around a sample stage is limited. Accordingly, in order to adopt a special axis configuration such as an inclination movement axis, it is necessary to devise how to incorporate a sample stage thereinto. However, various limitations are possible to be caused by adopting the special axis configuration. For example, according to the apparatus disclosed in Patent Document 2, the measurable sample thickness is limited. Further, according to the device disclosed in Patent Document 3, the measurement types are limited. On the other hand, according to the apparatus that is unable to be provided with a special axis configuration such as the RxRy attachment, a tilt of a sample in accordance with $\phi$ axis rotation thereof cannot be controlled.

SUMMARY OF THE INVENTION

The present invention has been achieved in view of such a situation, and it is an object to provide a control apparatus capable of controlling an accurate incident angle according to $\phi$ axis rotation by effectively using axes provided to a goniometer in a diffractometer, even if no special axis configuration is provided; and to provide a system, a method and a program thereof.

(1) In order to achieve the above-described object, it is a feature that the control apparatus according to the present invention is a control apparatus that controls a tilt of a sample, the control apparatus comprising an input section that receives an input of inclination information representing inclination of the sample with respect to a $\phi$ axis; an adjustment amount determination section that determines adjustment amounts of a ω value and a χ value for correcting a deviation amount between a scattering vector and a normal line to a sample surface or a lattice plane normal with respect to a $\phi$ value that varies, using the inclination information; and a drive instruction section that drives a goniometer according to $\phi$ axis rotation of the sample, based on the determined adjustment amounts of the ω value and the χ value, during an X-ray diffraction measurement.

In this manner, an adjustment angle for correcting a deviation amount between a scattering vector and a normal line to a sample surface or a lattice plane normal so as not to be affected by the ϕ axis rotation can be converted into the adjustment amounts of the ω value and the χ value that are independent of the ϕ axis rotation. As a result of this, the measurement accompanying the ϕ axis rotation can be achieved without adjusting inclination of the sample by attaching an RxRy attachment with a sample stage. Further, it also can be achieved to adjust the inclination of the sample with high accuracy.

(2) Further, it is a feature that in the control apparatus according to the present invention, the goniometer has three or more rotation axes that are simultaneously drivable, and the drive instruction section drives the goniometer using the three or more rotation axes. The measurement accompanying the ϕ axis rotation while adjusting the inclination of the sample using the goniometer can be achieved by using the three or more rotation axes of the goniometer, that are simultaneously drivable.

(3) Further, it is a feature that in the control apparatus according to the present invention, the three or more rotation axes comprise the ϕ axis, a χ axis, and a ω axis. In this manner, the measurement accompanying the ϕ axis rotation while adjusting the inclination of the sample can be achieved by a χ value and a ω value.

(4) Further, it is a feature that in the control apparatus according to the present invention, the ω axis is controlled by using a θs axis and a θd axis in combination as two drive axes, the θs axis being a rotation axis for controlling an incident angle of X-ray, and the θd axis being a rotation axis for controlling a receiving angle of X-ray. In this manner, it can be achieved to adjust the ω value by adjusting θs axis rotation and θd axis rotation.

(5) Further, it is a feature that the control apparatus according to the present invention is the control apparatus further comprising a storage section that stores the adjustment amounts of the ω value and the χ value with respect to the ϕ value that varies, as calculation expressions for χ and φ axis driving; wherein the drive instruction section drives the goniometer based on the calculation expressions for the stored time of driving. In this manner, the goniometer can be flexibly driven according to an individual situation by using the calculation expressions.

(6) Further, it is a feature that the control apparatus according to the present invention is the control apparatus further comprising a storage section that stores a correspondence relation of adjustment values of the ω value and the χ value with respect to the ϕ value that varies, as a table, according to the inclination information; wherein the adjustment amount determination section determines the adjustment values of the ω value and the χ value, based on the correspondence relation in the stored table. In this manner, a processing amount can be reduced by using the table, and thus easy and quick response is enabled.

(7) Further, it is a feature that the control apparatus according to the present invention is the control apparatus further comprising an off angle calculation section that calculates an off angle between the lattice plane and an outer shape surface of the sample, based on the adjustment amounts of the ω value and the χ value. In this manner, for example, when comparing adjustment amounts of the ω value and the χ value corresponding to values of the Rx axis and the Ry axis, not only the off angle of the substrate surface but also an angular amount of the off angle between a substrate and an epitaxial growth film, and a deviation azimuth thereof can be analyzed.

(8) Further, it is a feature that in the control apparatus according to the present invention, the X-ray diffraction measurement is an in-plane XRD measurement, an in-plane pole figure measurement with 2θχ axis, a rocking curve measurement or a reciprocal space mapping. Specifically, in the measurement accompanying the ϕ axis rotation, that is typified by the in-plane XRD measurement, the measurement with high accuracy can be carried out without using the RxRy attachment.

(9) Further, it is a feature that in the control apparatus according to the present invention, the adjustment amount determination section determines the adjustment amounts of the ω value and the χ value at every measuring position on an XY stage placed on the goniometer, and the drive instruction section performs an instruction for driving the goniometer according to the ϕ axis rotation of the sample at the every measuring position on the XY stage, based on the determined adjustment amounts. In this manner, the measurement accompanying the ϕ axis rotation can be carried out by adjusting the position of the sample with an XY stage in advance.

(10) Further, it is a feature that the system according to the present invention is a system comprising the control apparatus according to the above (1) to (9), and an X-ray diffractometer constituting an optical system for incident X-rays to the sample and detecting X-rays diffracted from the sample, the X-ray diffractometer comprising the goniometer in the optical system; wherein the goniometer having three or more rotation axes that are simultaneously drivable is driven by the instruction from the control apparatus. In this manner, an adjustment angle for correcting a deviation amount between a scattering vector and a normal line to a sample surface or a lattice plane so as not to be affected by the ϕ axis rotation can be converted into the adjustment amounts of the ω value and the χ value that are independent of the ϕ axis rotation.

(11) Further, it is a feature that the method according to the present invention is a method of controlling a tilt of a sample, the method comprising the steps of receiving an input of inclination information representing inclination of the sample with respect to a ϕ axis; determining adjustment amounts of a ω value and a χ value for correcting a deviation amount between a scattering vector and a normal line to a sample surface or a lattice plane with respect to a ϕ value that varies, using the inclination information; and driving a goniometer according to ϕ axis rotation of the sample, based on the determined adjustment amounts of the ω value and the χ value, during an X-ray diffraction measurement. In this manner, the adjustment angle for correcting the deviation amount between the scattering vector and the sample surface normal or the lattice plane so as not to be affected by the ϕ axis rotation can be converted into the adjustment amounts of the ω value and the χ value that are independent of the ϕ axis rotation.

(12) Further, it is a feature that the program according to the present invention is a program for controlling a tilt of a sample, the program causing a computer to execute the processes of receiving an input of inclination information representing inclination of the sample with respect to a ϕ axis; determining adjustment amounts of a ω value and a χ value for correcting a deviation amount between a scattering vector and a normal line to a sample surface or a lattice plane with respect to a ϕ value that varies, using the inclination information; and driving a goniometer according to ϕ axis rotation of the sample, based on the determined adjustment amounts of the ω value and the χ value, during an X-ray diffraction measurement. In this manner, the adjustment angle for correcting the deviation amount between the scattering vector and the sample surface normal or the lattice plane so as not to be affected by the φ axis rotation can be converted into the adjustment amounts of the ω value and the χ value that are independent of the φ axis rotation.

According to the present invention, it can be achieved to accurately control an incident angle according to a φ axis rotation by effectively using axes provided to a goniometer in a diffractometer, even if no special axis configuration is provided.

BRIEF DESCRIPTION OF THE DRAWINGS

FIG. 8 a table showing drive control values ω and χ, and adjustment amounts Δω and Δχ with respect to the φ value.

DETAILED DESCRIPTION OF EMBODIMENTS

Figure 1A:
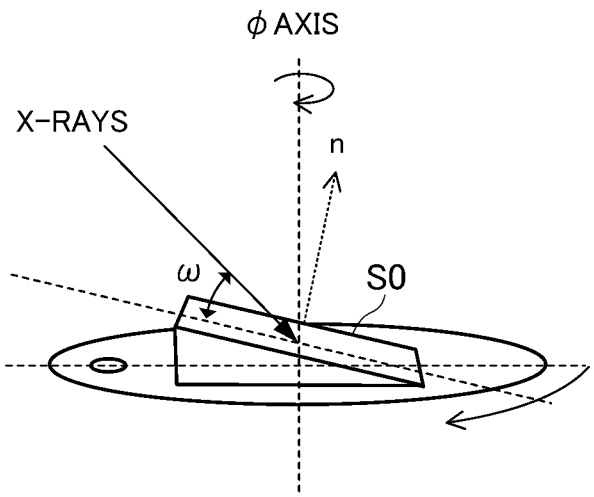
FIGS. 1A and 1B are schematic diagrams showing samples at φ=0° and φ=180° via control according to the present invention, respectively.

Next, embodiments of the present invention are described referring to the drawings. In order to facilitate understanding of the description, reference number indicating the same constituent element is used as same and overlapping descriptions are omitted in each drawing.

[Principle]

According to the present invention, an incident angle of X-ray (ω) and a swing angle (χ) of a sample in conjunction with movement of a sample rotation axis (φ axis) are moved, a sample normal line is maintained in a constantly adjusted state in the same manner that a sample surface normal is matched with the φ axis in advance. In addition, the φ axis indicates an axial center line of a sample support member itself, and the ω axis is an axial line extending in a horizontal direction. The χ axis is an axial line extending in the horizontal direction and perpendicular to the ω axis.

Figure 1B:
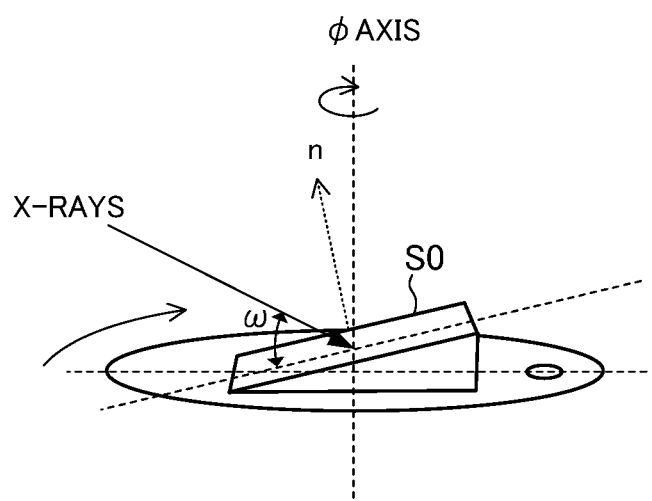

FIGS. 1A and 1B are schematic diagrams showing samples S0 at φ=0° and φ=180° via control according to the present invention, respectively. As shown in FIGS. 1A and 1B, a normal line n to a sample S0 surface is not identical to the φ axis are not, however an incident angle of X-ray on the sample surface is maintained to be constant at any of φ=0° and φ=180°. In addition, it is not only the sample surface that the X-ray incident angle is constantly maintained to, but also a lattice plane.

Such a measurement is accomplished by confirming inclination information of a sample surface or a lattice plane in advance to adjust the ω value and the χ value according to the φ axis rotation. That is, the adjustment state is maintained by performing ω-scanning at each of positions of φ=0°, φ=90°, and φ=180° during axially vertical adjustment to calculate the axial deviation amounts, and making two axes of ω and χ move in conjunction with the movement of φ during measurement. The measurement data obtained in this manner can be equated with the case of performing an RxRy axes adjustment with an RxRy attachment in advance. In addition, the inclination information referring to information corresponding to RxRy is equivalent to an inclination α and an azimuth β of a sample from the φ axis.

The measurement data is acquired similarly in the case of using the RxRy attachment, and thus the method according to the present invention is also referred to as "virtual RxRy axes". In addition, the control as described above is particularly effective for a technique and an in-plane XRD measurement concerning holding of a sample azimuth in the measurement of an epitaxial thin film or the like, a pole figure measurement using an in-plane axis, and a technique concerning holding of a sample in a rocking curve measurement or a reciprocal space mapping.

[Configuration of System]

Figure 2:
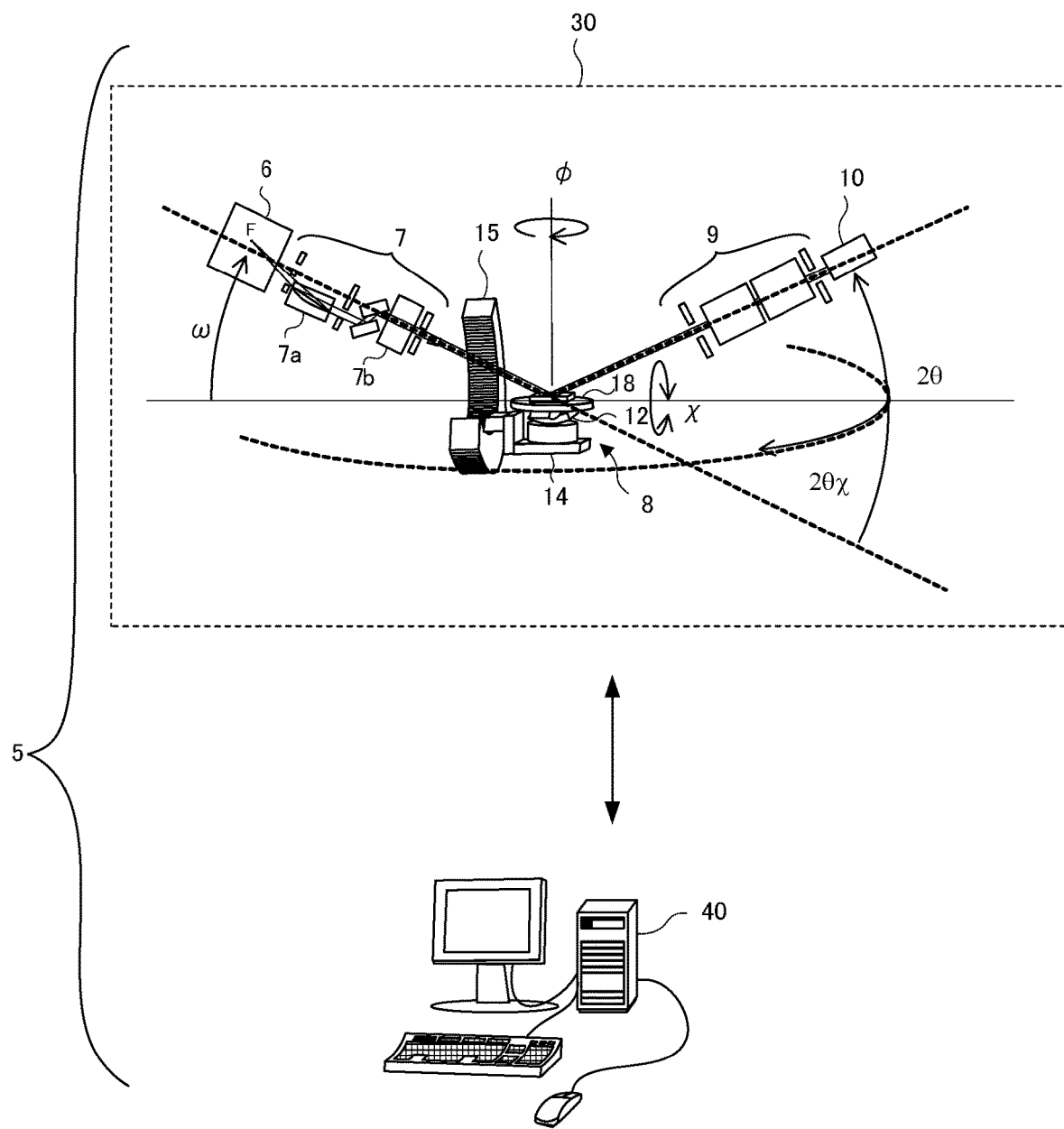
FIG. 2 is a diagram showing one example of a configuration of an X-ray diffraction measurement system according to the present invention.
Figure 3:
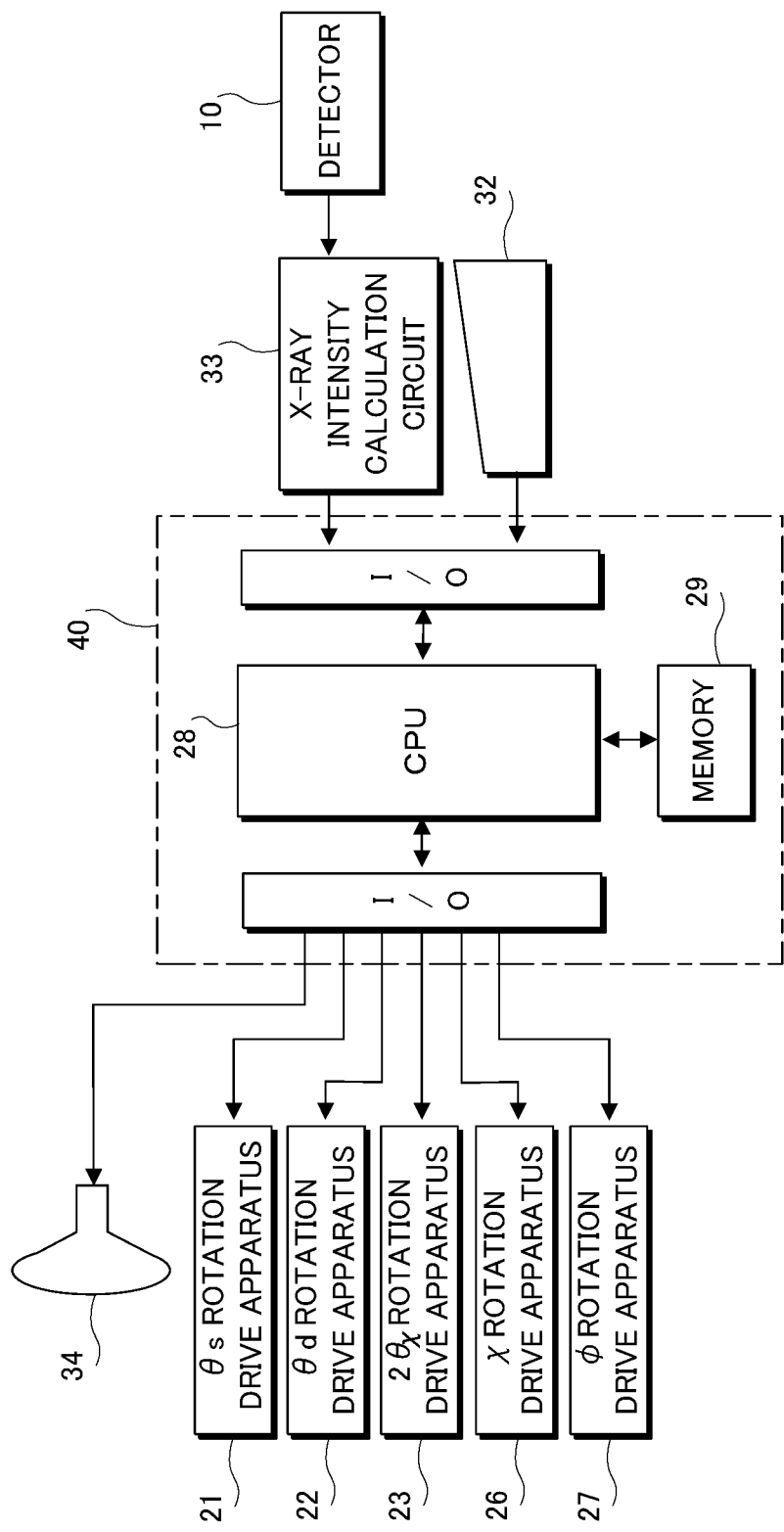
FIG. 3 is a diagram showing one example of a measurement system according to the present invention.

FIG. 2 is a diagram showing one example of a configuration of an X-ray diffraction measurement system 5. Further, FIG. 3 is a diagram showing one example of a hardware configuration of an X-ray diffraction measurement system. The system 5 comprises an X-ray diffractometer 30 and a control apparatus 40. The X-ray diffractometer 30 comprises an optical system that irradiates X-rays to a sample and detects X-rays diffracted from the sample, the optical system comprising a goniometer. In addition, the configuration shown in FIG. 2 is one example, and thus various other configurations may be adopted. The control apparatus 40 is, for example, PC and is an apparatus provided with CPU and a memory.

The X-ray diffractometer 30 comprises an X-ray generation section 6 that generates X-rays from an X-ray focus, that is, an X-ray source F, an incident side optical unit 7, and a five-axis goniometer 8 that measures an angle for a sample S0 and a detector 10 in a point region.

The X-ray source F, for example, can be constituted by a filament that emits thermions, and a target arranged facing the filament, and in this case, the thermions emitted from the filament collide with the target at high speed to emit X-rays from the target.

A paraboloid multilayer mirror 7a and a soller slit 7b for restricting divergence of X-rays in a lateral direction are arranged inside the incident side optical unit 7 along an advance passage of diverged X-rays R that emitted from the X-ray source F. Such an optical element configuration is one example preferably suitable for the in-plane diffraction measurement, and various configurations may be practically adopted.

A sample stage comprises a base part 14, a head part 12, and a sample plate 18. A χ cradle (χ axis adjustment mechanism) and the base part 14 are integrated, and the whole sample stage can be swung along the cradle. The base part 14 is provided with a Z axis adjustment mechanism and a φ axis rotation mechanism. The Z axis adjustment mechanism adjusts height of the sample S0. The φ axis rotation mechanism rotates the sample S0. The head part 12 is detachably changeable according to measurement applications. The RyRy attachment is one of head part 12 types. In addition, an XY attachment may be attached to the head part 12 and used as an XY stage enabling movement of the stage parallel to the stage surface. The head part 12 is constituted so that the sample plate 18 can be attached onto an upper portion thereof. The sample plate 18 is prepared as one capable of placing the sample S0 with any size of 4 to 8 inches or a sucking table by air suction, and so forth. The sample S0 is attached onto the sample plate 18 by adhering by an adhesive, sucking by air suction, and various other methods as needed.

The five-axis goniometer 8 shown in FIG. 2 comprises an incident side arm and a receiving side arm. The incident side arm supports the X-ray generation section 6 and the incident side optical unit 7, and the receiving side arm supports a receiving side optical unit 9 and the detector 10. Further, a ω (θs) rotation system that rotates vertically to the sample surface (in the arrow ω direction) is connected to the incident side arm. Further, a 2θ (θd) rotation system that rotates vertically to the sample surface (in the arrow 2θ direction), and a 2θχ rotation system that rotates horizontally to the sample surface (in the arrow 2θχ direction) are connected to the receiving sidearm. The rotation axis of the arm connected to the 2θχ rotation system is referred to as an in-plane axis in the present specification.

In FIG. 2, a sample horizontal type goniometer is exemplified, however as long as it is a configuration of an equivalently scannable goniometer, the axis name and the axial scanning direction, and the rotation direction may be changed. For example, a horizontal type goniometer for which 2θ scanning is performed in the sample horizontal direction or a goniometer constituted as a semiconductor test device and so forth can also be controlled by the control apparatus according to the present invention.

The five-axis goniometer 8 having three or more rotation axes that are simultaneously drivable is preferably driven by an instruction from the control apparatus. In this manner, the measurement accompanying the φ axis rotation while adjusting the inclination of the sample can be achieved with no RxRy attachment. For example, The five-axis goniometer 8 is so constituted that scanning of five axes (ω, χ, φ, 2θ and 2θχ axes) is enabled as measurement axes.

Further, the three or more rotation axes that are simultaneously drivable preferably include a φ axis, a χ axis and a ω axis. In this manner, the measurement accompanying the φ axis rotation while adjusting the inclination of the sample can be achieved by a χ value and a ω value. The φ axis, the χ axis and the ω axis are respective three axes in the orthogonal relationship with each other.

The φ axis is an in-plane rotation axis (axis perpendicular to a surface) of the surface of a stage on which a sample is placed. The ω axis is an axis for controlling an incident angle of X-ray on the sample surface by controlling a posture of the sample or an X-ray source. The χ axis is an axis for controlling an inclination (equal to a swing) of a sample reference plane in the direction vertical to the traveling direction of X-rays when the ω value is 0°. In addition, the above-described "sample reference plane" means either an outer shape surface of the sample as a measurement object or a lattice plane of a crystal contained in the sample, according to the measuring purpose.

It is preferred that the five-axis goniometer 8 further includes the φ axis, the χ axis, the θs axis and the θd axis as four rotation axes in the case of being a sample horizontal type thereof. In this case, the ω axis and the 2θ axis are controlled by using the θs axis and the θd axis in combination as two drive axes with the sample horizontal axis as a reference. In addition, the θs axis is a rotation axis for controlling an incident angle of X-ray, and the θd axis is a rotation axis for controlling a receiving angle of X-ray. When controlling only the ω axis, the θs axis is rotated by an amount equivalent to a drive control value of the ω value. The θd axis is also rotated simultaneously by the same amount in the same direction. Further, when simultaneously controlling the ω axis and the 2θ axis, the ω value and the 2θ value, and the θs value and the θd value are controlled so as to satisfy ω=θs and 2θ=θs+θd.

In this manner, it is preferred that the θs axis and the θd axis are further available as control axes of ω and 2θ for five-axis goniometer 8. Accordingly, they are suitably applicable for various measurements accompanying not only object arrangement (2θ/θ) but also asymmetric arrangements (an in-plane XRD measurement, 2θ/ω scan, a ω scan and a pole figure measurement using an in-plane axis, and so forth).

The five-axis goniometer 8 have an axis for moving a sample, an axis for measurement, an axis for rotating a stage in-plane and an axis for swinging the sample, each which are simultaneously controllable. Further, when specifically measuring a single crystal, before measuring it, it becomes necessary to adjust an azimuth thereof. In the measurement of a single crystal, high accuracy is required in angle control, and thus it is preferred to be adjusted with high accuracy by a goniometer a rotation radius of which is larger than that of the RxRy attachment.

The receiving side optical unit 9 and the detector 10 arranged on a rear side thereof that constitute a receiving side arm are rotatably supported by a 2θ rotation system or a 2θχ rotation system. A receiving slit and a soller slit for limiting divergence of X-rays in a lateral direction are stored in the receiving side optical unit 9.

Each axis as described above is driven by each rotation drive apparatus. The relationship between a drive apparatus and rotation of each axis is as follows. That is, the ω axis rotation is driven by a θs rotation drive and a θd rotation drive apparatus 22. The 2θ axis rotation is driven by the θs rotation drive apparatus 21. The 2θχ axis rotation is driven by a 2θχ rotation drive apparatus 23. The χ axis rotation is driven by a χ rotation drive apparatus 26. The φ axis rotation is driven by a φ rotation drive apparatus 27. Further, a Z axis drive apparatus, an X axis Y axis drive apparatus and so forth are appropriately available, and are designed to be able to move a sample in parallel to each axis.

Any of the θs rotation drive apparatus 21, the θd rotation drive apparatus 22, the 2θχ rotation drive apparatus 23, the χ rotation drive apparatus 26, the φ rotation drive apparatus 27, the Z axis drive apparatus, and the X axis Y axis drive apparatus can be constituted using a drive source such as an electric motor or the like, a power transmission apparatus such as a worm and a worm wheel or the like, and so forth.

Then, according to these drive apparatuses, as shown in FIG. 3, these operations are controlled by a control apparatus 40 comprising CPU 28 and a memory 29. The memory 29 comprises an internal memory such as ROM (Read Only Memory), RAM (Random Access Memory) and so forth, and an external memory such as a hard disk and so forth. A program software by which a series of operations are achieved for an X-ray diffraction analysis method executed by an X-ray diffractometer 30 is stored inside the ROM in the memory 29, for example.

A keyboard 32 as an input device operated by an operator, and an X-ray intensity calculation circuit 33 connected to an output terminal of the detector 10 (Refer to FIG. 2) are connected to an input port of the control apparatus 40. The X-ray intensity calculation circuit 33 calculates an X-ray intensity based on an output signal of the detector 10. The calculated X-ray intensity is transmitted to CPU 28 in the form of a signal, and is subjected to calculation processing with the CPU 28. Then, the calculated X-ray intensity is displayed on a display 34 as a video image in the form of a graph or the like, as needed.

The X-ray diffractometer 30 is constituted as above. When performing an X-ray diffraction measurement, for example, an in-plane diffraction measurement using the foregoing apparatus, a sample S0 is attached to a predetermined position of a sample plate 18 shown in FIG. 2. An X-ray incident angle ω on the sample S0 is set to a very small angle very closely to the sample surface, and an angle 2θ of the detector 10 with respect to the sample S0 is set to a predetermined value corresponding to the X-ray incident angle ω.

Then, X-rays generated from the X-ray source F is monochromatized by the paraboloid multilayer mirror 7a, for example, CuKα rays are monochromatized to simultaneously form a divergent X-ray beam into a parallel X-ray beam. Further, the parallel X-ray beam is made to be incident on the sample S0 at a very small incident angle ω with the soller slit 7b, while limiting divergence thereof in the lateral direction. In this state, the detector 10 is rotationally moved around the sample S0 in a scanning manner by rotation centering on a 2θχ axial line to detect in-plane diffraction rays by the detector 10 during scanning rotation thereof.

[Configuration of Control Apparatus]

Figure 4:
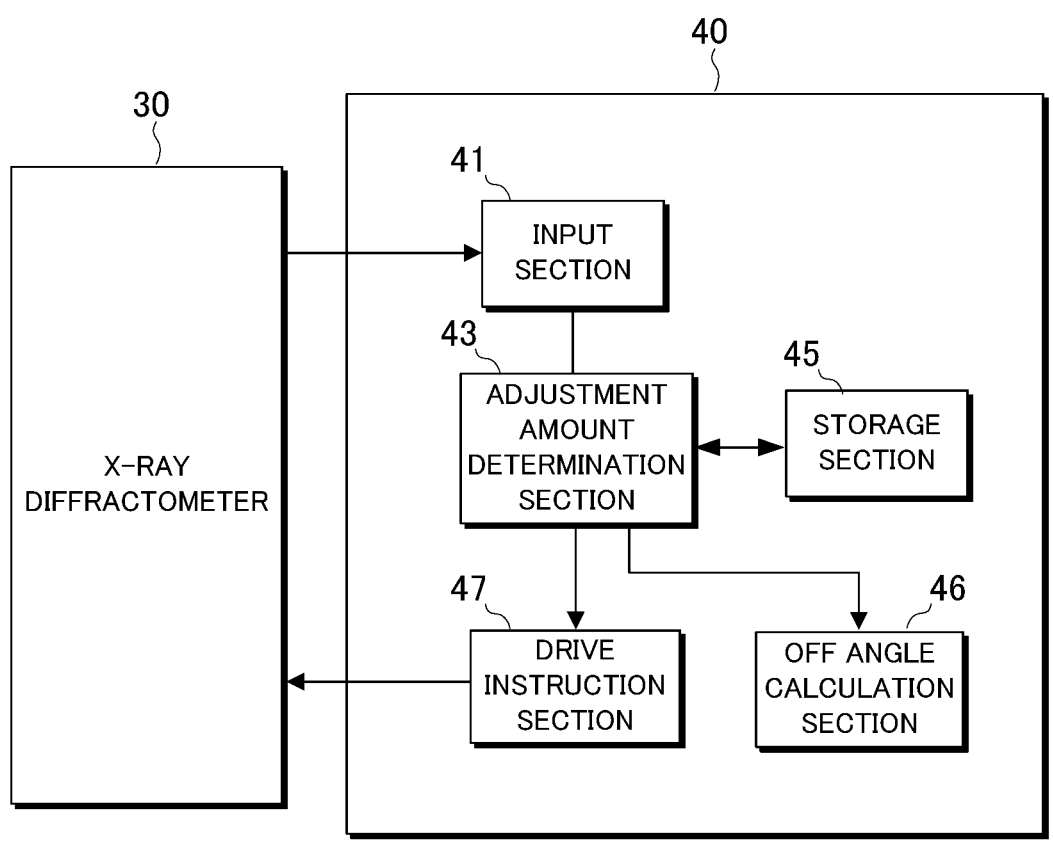
FIG. 4 is a block diagram showing a functional configuration of a control apparatus according to the present invention.

FIG. 4 is a block diagram showing a functional configuration of a control apparatus 40. The control apparatus 40 comprising an input section 41, an adjustment determination section 43, a storage section 45 and a drive instruction section 47 controls a tilt of a sample during X-ray diffraction measurement. The control apparatus 40 is PC, for example. Specifically, in the measurement accompanying the φ axis rotation, that is typified by the in-plane one, the measurement with high accuracy can be carried out with no adjustment by an RxRy attachment.

The input section 41 receives an input of inclination information representing inclination of a sample with respect to the φ axis. The inclination information is information representing a direction of a normal line to a sample surface with respect to the φ axis according to a specific φ value or information equivalent thereto, and is information also corresponding to preadjustment of RxRy. As described later, it may be information of a peak position by a ω scan at each of φ=0°, φ=90° and φ=180°. The information of the peak position may be input automatically from data detected by the X-ray diffractometer 30, and be input by an operator.

The adjustment amount determination section 43 determines adjustment amounts of the ω value and the χ value for correcting a deviation amount between a scattering vector and the sample surface normal or the lattice plane with respect to the φ value that varies, using the inclination information. The storage section 45 stores calculation expressions or a table for determining the adjustment amounts. The adjustment amount determination section 43 can determine the adjustment amounts of the ω value and the c value at every measuring position on an XY stage placed on the goniometer 8. In this manner, the measurement accompanying the φ axis rotation can be achieved by performing positional adjustment of the sample by the XY stage in advance, and thus in-plane mapping can also be achieved.

The adjustment amount determination section 43 determines the adjustment amounts of the ω value and the χ value for correcting the deviation amount between the scattering vector and the sample surface normal or the lattice plane based on the stored calculation expressions and inclination information. In this manner, the goniometer can be flexibly driven by using the calculation expressions according to an individual situation.

Further, a table from which a correspondence relation of the adjustment values of the ω value and the χ value with respect to the φ value that varies is specified according to the inclination information to determine the adjustment values of the ω value and the χ value using the correspondence relation in the specified table. In this manner, a processing amount can be reduced by using the table, and thus easy and quick response is enabled.

The off angle calculation section 46 calculates an off angle between a lattice plane and an outer shape surface of a sample, based on the adjustment amounts of the ω value and the χ value. The calculated off angle used for analysis is displayed with a display or the like. In this manner, for example, when comparing adjustment amounts of the ω value and the χ value corresponding to values of the Rx axis and the Ry axis, not only the off angle of the substrate surface but also an angular amount of the off angle between azimuths of a substrate and an epitaxial growth film, and a deviation azimuth thereof, for example, can be analyzed. In addition, the off angle of the substrate surface is an off angle due to non-coincidence of the substrate surface and the substrate lattice plane, and the off angle between the azimuths of the substrate and the epitaxial growth film is an off angle due to non-coincidence of a crystalline plane of a substrate and a crystalline plane of a film.

The drive instruction section 47 drives a goniometer according to φ axis rotation of the sample, based on the determined adjustment amounts of the ω value and the χ value, during an X-ray diffraction measurement. In this manner, an adjustment angle for correcting a deviation amount between a scattering vector and a normal line to a sample surface or a lattice plane so as not to be affected by the φ axis rotation can be converted into the adjustment amounts of the ω value and the χ value that are independent of the φ axis rotation. As a result of this, the measurement accompanying the φ axis rotation can be achieved without adjusting inclination of the sample by attaching an RxRy attachment onto a sample stage. Further, it also can be achieved to adjust the inclination of the sample with high accuracy.

In addition, as to the sample surface, it corresponds to correction of a deviation amount that a sample surface normal (sample system) is made to be identical to a scattering vector under a total reflection condition (apparatus system). Further, as to the lattice plane, it corresponds to correction of a deviation amount that a normal line to the lattice plane (sample system) is made to be identical to a scattering vector under a diffraction condition (apparatus system).

As a result of this, the measurement accompanying the φ axis rotation can be achieved with no adjustment of the sample inclination by attaching an RxRy attachment on a sample plate. Further, it becomes possible that a temperature adjustment mechanism of the sample or each of other attachments such as an XY stage provided with the temperature adjustment mechanism of the sample is used therewith in combination.

The drive instruction section 47 performs an instruction for driving the XY stage placed on a goniometer. Then, the instruction for driving the goniometer according to φ axis rotation of the sample at every measuring position of an XY stage is given based on the determined adjustment amount. The measurement can be carried out by performing a positional adjustment of the sample with the XY stage in advance, though not being enabled when adjusting the sample inclination using the RxRy attachment.

The drive instruction section 47 preferably drives the goniometer using three or more rotation axes that are simultaneously drivable. The measurement accompanying the φ axis rotation while adjusting the sample inclination using the goniometer can be achieved by using the three or more rotation axes of the goniometer, that are simultaneously drivable.

[X-Ray Diffraction Measurement Method]

Figure 5:
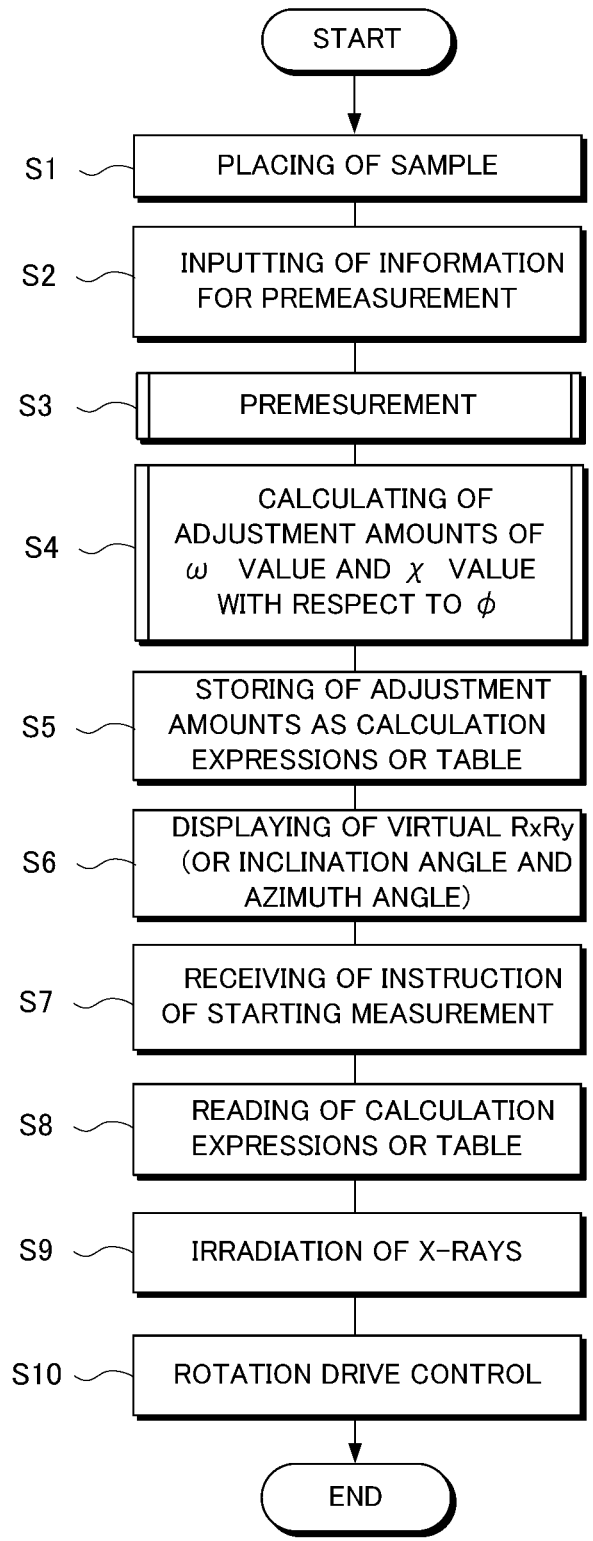
FIG. 5 is a flowchart showing an X-ray diffraction measurement method according to the present invention.

FIG. 5 is a flowchart showing an X-ray diffraction measurement method according to the present invention. A measurement method and a measurement condition in the present measurement are set as an advance preparation. At this time, the measuring method is replaced by an optical system to perform the optical system adjustment, as needed. Initial values (ω0, χ0) before the correction are determined by these operations.

As shown in FIG. 5, first, an epitaxial film sample, a single crystal sample or the like is placed as a sample S0 on a sample plate 18 in an X-ray diffractometer 30 (step S1). Then, information for premeasuring a φ position where a ω scan is performed, or the like is input (step S2). Premeasurement for acquiring inclination information of the sample S0 is carried out (step S3). Specifically, an inclination α and an azimuth β of the sample from the φ axis are obtained as inclination information. The premeasurement is after-mentioned in detail.

The inclination information of the sample S0 obtained by the premeasurement is input into the control apparatus 40. The control apparatus 40 reads calculation expressions from the storage section 45 to calculate adjustment amounts of a ω value and a χ value with respect to a φ value using the read calculation expressions (step S4). In addition, the adjustment amounts may be directly input in a manual manner in place of steps S2 to S4. The calculations of the adjustment amounts are after-mentioned in detail. The resulting adjustment amounts are stored as a table together with the drive control values calculated from calculation expressions or adjustment amounts for χ and φ axis driving (step S5). The calculations of the drive control values are after-mentioned in detail. Then, displaying virtual RxRy, or an inclination angle and an azimuth angle is made (step S6).

Next, after preparation is finished, an operator inputs an instruction of starting a measurement, and the control apparatus 40 receives the instruction of starting the measurement (step S7) to read calculation expressions or a table for driving, that is stored in the step S5 (step S8). Then, irradiation of X-rays in the X-ray diffractometer 30 is performed (step S9), and simultaneously controlling drive axes and controlling X-ray detection or the like are performed (step S10), followed by ending the measurement when axial driving in a desired range is completed. At this time, the drive control values obtained in the above-described step S5 are used for simultaneously controlling the drive axes during measurement. According to the above-described example, the drive control is performed after calculation, but the calculation and the drive control may be performed simultaneously in parallel. In addition, the irradiation of X-rays and the simultaneous control of drive axes in the step S9 and the step S10 may be replaced with each other. That is, the present invention is applied thereto during adjustment of a sample position, and the X-ray irradiation is conducted after simultaneously controlling the drive axes to carry out measurements when rotating up to a target peak position before the X-ray irradiation.

[Premeasurement and Adjustment Amount Calculation]

Figure 6A:
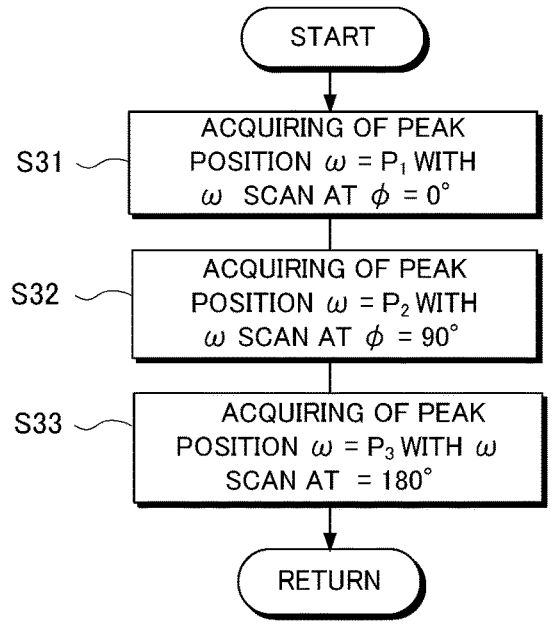
FIGS. 6A and 6B are flowcharts showing respective examples of a premeasurement operation and an adjustment amount calculation operation.
Figure 6B:
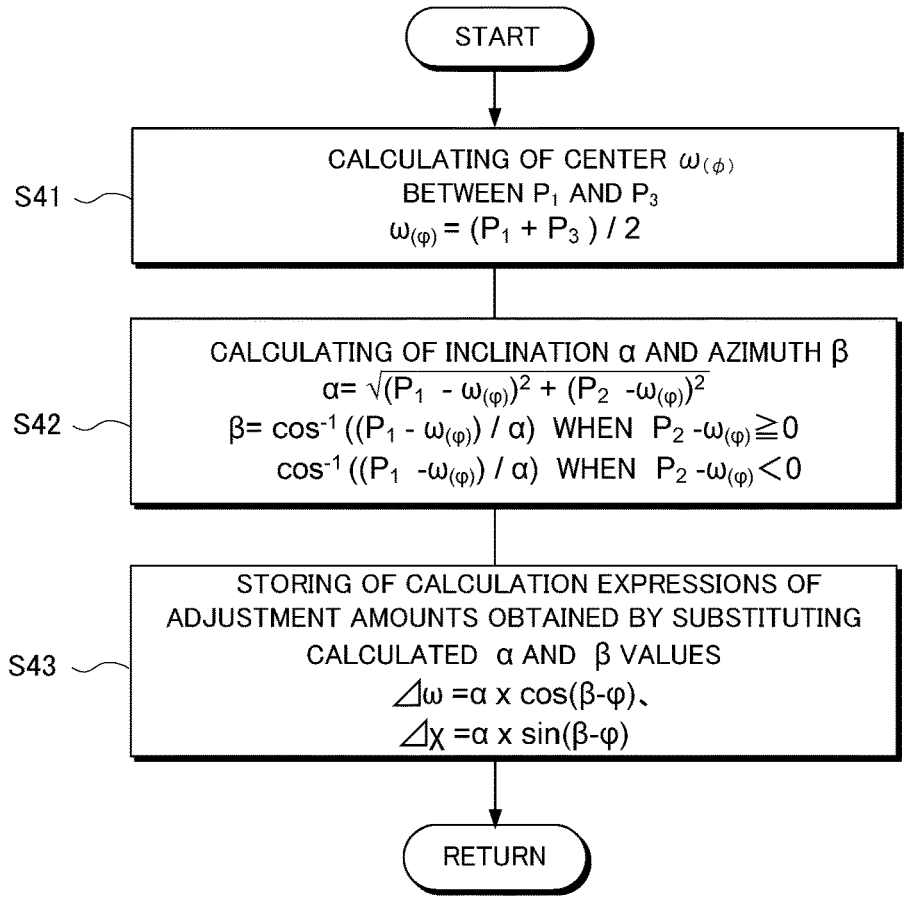

FIGS. 6A and 6B are flowcharts showing respective examples of a premeasurement operation and an adjustment amount calculation operation. Each of them refers to steps S2 and S5 in the flowchart of FIG. 5 and it returns to the referred flowchart after coming to End. As shown in FIG. 6A, as to the premeasurement, a ω scan is first performed at φ=0° to acquire a peak position ω=$P_1$ (step S31). Next, the ω scan is performed at φ=90° to acquire a peak position ω=$P_2$ (step S32). Then, the ω scan is performed at φ=180° to acquire a peak position ω=$P_3$ (step S33). When it is completed to acquire each peak position, the premeasurement is terminated.

In addition, a peak for scanning object differs therefrom according to which one of deviation amounts of a normal line to a sample surface and a normal line to a lattice plane is adjusted. In the case of the sample surface normal, setting is made to a total reflection condition. For example, in the case of a film exhibiting high density, setting is made to 2θ=0.8° to acquire a peak position in total reflection intensity. In the case of the normal line to the lattice plane, setting is made to a diffraction condition of a symmetrical plane of a film or a substrate. For example, in the case of a Si substrate, setting is made to 2θ=69.13° (Si 004) to acquire a peak position in diffraction intensity.

Further, the φ positions each where a ω scan is performed are not necessarily limited to 0°, 90° and 180°, and the ω scan for φ at each of three places may be measurable at every 90°. For example, the φ positions each where the ω scan is performed may be 10°, 100° and 190° with a place where deviation is given by 10° as a reference.

Data obtained as described above is obtained for calculating adjustment amounts. As shown in 6B, when calculating the adjustment amounts, offset values of ω and χ each corresponding to a φ value are calculated. First, a center ω(φ) between $P_1$ and $P_3$ is calculated as in the following calculation expression (1) (step S41).

$$\omega_{(\phi)} = (P_1 + P_3)/2 \quad \ldots (1)$$

Then, an inclination α and an azimuth β of a sample from the φ axis are calculated using the calculation expressions (2) (step S42).

$$\alpha = \sqrt{(P_1 - \omega_{(\phi)})^2 + (P_2 - \omega_{(\phi)})^2}$$

$$\beta = \cos^{-1}((P_1 - \omega_{(\phi)})/\alpha) \quad (P_2 - \omega_{(\phi)} \geq 0) \ldots (2)$$

$$\quad = -\cos^{-1}((P_1 - \omega_{(\phi)})/\alpha) \quad (P_2 - \omega_{(\phi)} < 0)$$

The resulting inclination α and azimuth β are input to the control apparatus 40. The control apparatus 40 reads the calculation expressions (3) stored in the storage section 45, and stores the calculation substituting α and β values calculated using the calculation expressions (2) as adjustment amounts used for the present measurements (step S43), followed by ending the processing of calculating the adjustment amounts. In addition, when the inclination α and the azimuth β are available beforehand, steps S2 to S42 can be omitted, and be substituted for directly inputting the inclination α and the azimuth β to the control apparatus 40.

$$\omega = \alpha \cos(\beta - \phi)$$

$$\chi = \alpha \sin(\beta - \phi) \quad \ldots (3)$$

Figure 7:
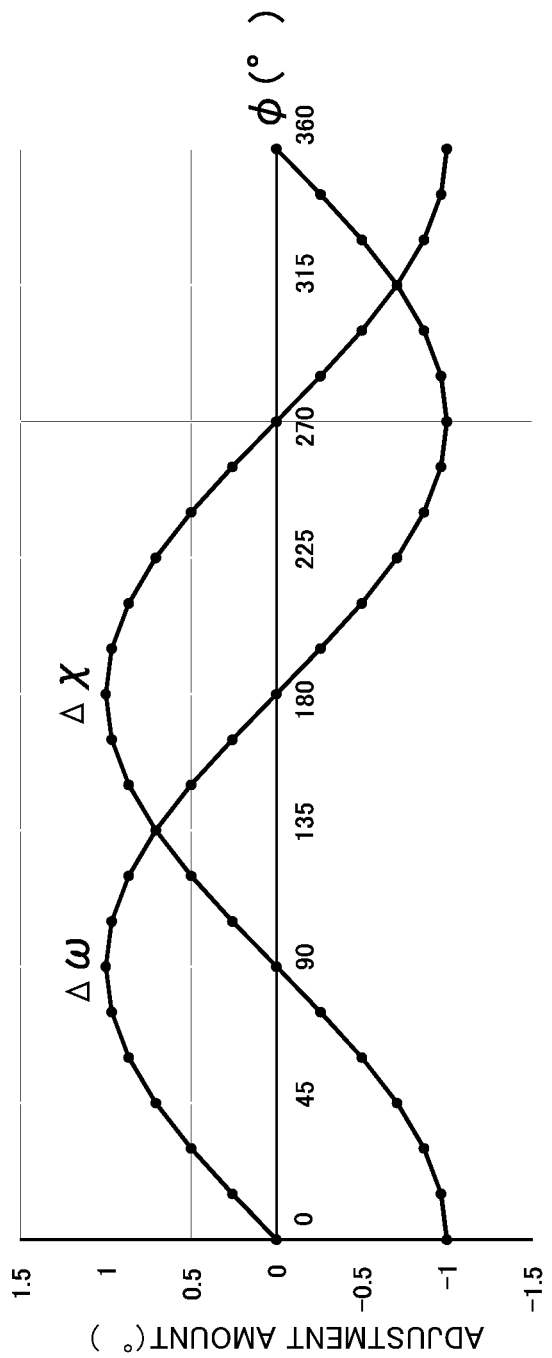
FIG. 7 is a graph showing adjustment amounts of the ω value and the χ value with respect to the φ value.
Figure 9:
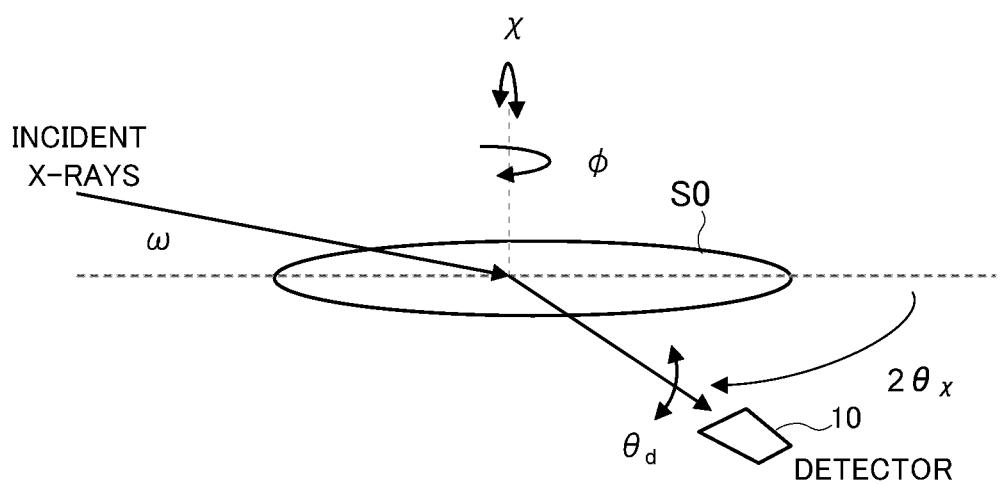
FIG. 9 is a schematic diagram showing a specific configuration used in Example.
Figure 10A:
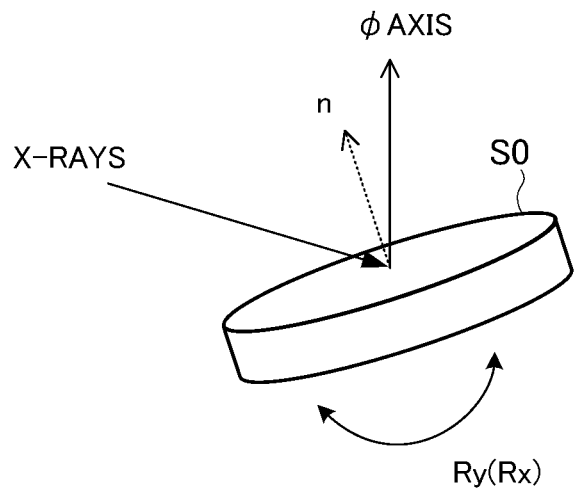
FIGS. 10A and 10B are schematic diagrams showing samples before and after adjusting the RxRy attachment, respectively.
Figure 10B:
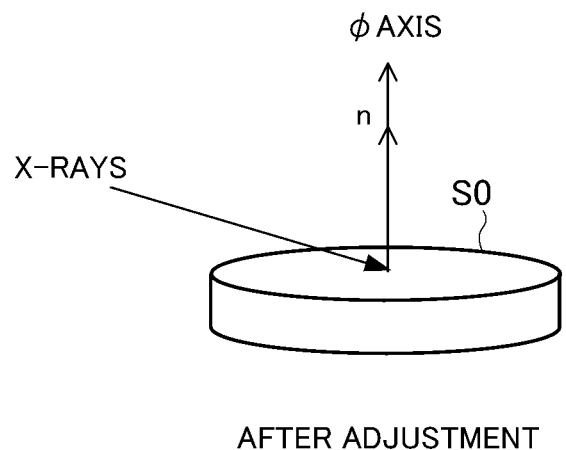

FIG. 7 is a graph showing the adjustment amounts of the ω value and the χ value with respect to the φ value. FIG. 7 is a figure in which the calculation expressions (3) when α=1 and β=0° is represented by a graph. The ω and χ are in an orthogonal relation, and thus as shown in FIG. 7, the adjustment amount Δχ is delayed in phase from the adjustment amount Δω by 90° with respect to variation of the φ value. For example, when a normal line to a sample surface is inclined with respect to the φ axis, the relationship between the φ rotation and a peak position of a rocking curve can be expressed by a sine curve.

Further, as to the above-described premeasurements, the φ positions each where the ω scan is performed are set to be three places, but the ω scan is performed from φ=0° to φ=360° at each arbitrary angle, and a peak may be acquired for each φ position. Adjustment amounts Δω each are calculated by subtracting a reference value from each of the resulting peak values. For example, when performing the ω scan at each 15° as setting 2θ=0.5°, the reference value becomes ω=2θ/2=0.25°. The values obtained by subtracting 0.25° from all of the resulting peak values, respectively become adjustment amounts (Δω). The Δω of the corresponding φ is applied to Δχ with the Δω value at φ=90° as Δχ at φ=0°. The table collectively made in such a manner is also usable for adjustment amounts. When the premeasurement is ended, the table is automatically generated. When a table of the similar form thereto is available beforehand, (steps S2 to S4) can be omitted, and be substituted for directly being input to the control apparatus 40.

The resulting adjustment amounts are converted into drive control values for which initial values before correction each are set as a reference, and are stored. The control apparatus 40 reads the calculation expressions (4) stored in the storage section 45, and stores the calculation expressions of adjustment amounts obtained by substituting input ω0 and χ0 values as drive control values used for the present measurements. As to the ω0 and χ0, the values are determined based on the measurement method and measurement condition in the present measurement, and the result of optical system adjustment. For example, when taking the measurement method as an in-plane XRD measurement, and setting an incident angle ω=0.5° in the measurement condition, a calculation expression obtained by substituting 0.5 into the ω0 value in the calculation expressions (4) becomes a drive control value. According to the configuration of the five-axis goniometer 8 shown in FIG. 2, the χ0 value is determined by the result of assembling accuracy as well as optical system adjustment. The case where the sample stage is attached on to a χ cradle in such a manner that the surface of a sample plate becomes horizontal to a direct beam results in χ0=0°. When the attachment is deviated therefrom, or the like, the deviation amount from the horizontal of the sample plate surface with respect to the direct beam is used as χ0. In addition, the above-described deviation amount is obtained by the optical system adjustment.

$$\Box_{\omega=\chi_0}\Box\Box_\omega$$

$$\Box_{\chi=\chi_0}\Box\Box_\chi\Box\ldots\Box\Box\Box\Box$$

Next, calculations of ω and χ, and rotation drive of φ are repeatedly performed. The calculation expressions of the adjustment amounts obtained by substituting ω0 and χ0 values into the calculation expressions (4) for calculating ω and χ. For example, when setting a step during 2θχ/φ measurement to 0.1° as a measurement condition, the φ rotation is performed with a 0.05° step. The drive control values when control is started are calculated as a drive start position of the φ rotation. Then, the ω and χ values are calculated using φ values increased at 0.05° intervals. The calculation of drive control values and the simultaneous control are repeated at each step of φ.

When using a table made to be stored in another embodiment of the premeasurement, drive control values (ω, χ) are calculated based on adjustment amounts (Δω, Δχ) with respect to φ using the calculation expressions (4) to store a table obtained by transcribing values calculated in the same table. FIG. 8 a table showing drive control values ω and χ, and adjustment amounts Δω and Δχ with respect to the φ value. When using a table, the control is performed while referring to drive control values of the table, with the φ value corresponding to a drive start position of the φ rotation, and the ω and χ values as drive control values corresponding thereto as drive start values. Further, when the driving interval is finer than the interval in the table, values obtained by linearly interpolating values each between two points may be calculated and used.

Further, conversion into a table form may be made based on the calculation expressions of adjustment amounts obtained by substituting the ω0 and χ0 values into the calculation expressions (4) of the adjustment amounts. In this case, a table obtained by transcribing drive control values calculated with an arbitrary φ step is stored. Calculation cost during control is reduced by totally calculating the drive control values beforehand, and thus throughput during control is improved.

Example 1

(Reciprocal Space Mapping Measurement)

As to a single crystal substrate or a single crystal thin film (an epitaxial thin film) film-formed thereon, its lattice constant and strain state are evaluated. These evaluations are carried out by reciprocal space mapping of a lattice plane (an asymmetrical plane) tilted from a lattice plane (symmetrical plane) close to the film thickness direction.

The in-plane rotation and inclination of the lattice plane as a measurement object need to be adjusted in advance before the measurement. When evaluating a degree of inclination from a symmetrical plane, after adjusting height of a sample according to conventional adjustment procedures, procedures such as the adjustment (φ scan) in the rotation direction on the asymmetrical plane, the adjustments (ω scan and χ scan) of inclination and swing from the symmetrical plane surface, and the adjustment (ω scan) of inclination from a symmetrical plane on the asymmetrical plane again need to be adjusted. Further, in order to subject a plurality of asymmetrical planes to the reciprocal space mapping, this operation needs to be performed for each measurement surface. These operations can be simplified by executing the present invention.

Procedures of the reciprocal space mapping around GaN (11-24) of a GaN epitaxial thin film c axis-grown with respect to the film thickness direction are described as an example.

Condition-setting the measurement arrangement (ω0: 89.09°, 2θ: 99.9) of GaN (11-24) is made in order to perform the reciprocal space mapping of the asymmetrical plane in advance. Next, the GaN epitaxial thin film is arranged on a sample plate to perform adjusting of sample height (corresponding to step S1). Then, the premeasurement using a peak of a symmetrical plane GaN (0002) is performed (corresponding to steps S2 and S3) to acquire an inclination α and an azimuth (azimuth angle) β of c axis of GaN from the φ axis. Then, the adjustment amounts of the ω value and χ value with respect to the φ value are calculated based on the acquired inclination α and azimuth (azimuth angle) β (corresponding to step S4).

Next, the drive control values obtained from the incident angle ω0 as a reference according to the measurement arrangement of GaN (11-24) are stored (corresponding to step S5). At this time, displaying the virtual RxRy, or the inclination angle and the azimuth angle may be made (corresponding to step S6). Then, an instruction for performing adjustment is given by moving to the measurement arrangement of GaN (11-24) (corresponding to step S7). Next, the stored calculation expressions are read (corresponding to step S8). Then, when φ axis-rotating the sample up to the measurement arrangement, simultaneously controlling the drive axes is performed. Then, X-ray irradiation is performed and the adjustment thereof is made to perform simultaneously controlling of the drive axes during adjustment of the rotation direction of the asymmetrical plane (φ scan) (corresponding to steps S9 and S10). After finishing the adjustment, the reciprocal space mapping around GaN (11-24) is started.

Thereafter, in order to measure another asymmetrical plane, drive control values can be updated only by condition-setting the measurement arrangement of the asymmetrical plane as a measurement object. At this time, the adjustment can also be omitted when relatively determining φ from the φ position of GaN (11-24) determined as above. For example, in order to measure GaN (10-15) present in the direction of performing in-plane rotation from GaN (11-24) by 30°, the value relatively moved by 30° from φ of GaN (11-24) adjusted as above may be set to the measurement arrangement (φ: adjustment value +30°, ω0: 73.08°, 2θ: 105.01° of GaN (10-15). Upon movement in accordance with the updated drive control values, the deviation amount can be moved to the corrected position, and thus the measurement can be started more easily than in conventional adjustment procedures.

The present invention is applied to the adjustment of the reciprocal space mapping of the asymmetrical plane in the above-described example, but can also be similarly applied to the adjustment of each of an out-of-plane diffraction measurement (2θ/ω scan) of an asymmetrical plane, a rocking curve measurement (ω scan) and a reciprocal space mapping of a symmetrical plane.

Example 2

(Rocking Curve Measurement Using in-Plane Axis)

According to a goniometer provided with an in-plane axis, a sample outer shape and a crystal orientation in an in-plane direction with respect to a crystal orientation of a substrate can be evaluated by measuring an azimuth of a lattice plane in an in-plane direction of the sample surface of a single crystal thin film. In the rocking curve measurement using in-plane axis, the penetration depth of irradiation X-rays into the sample can be controlled by controlling an incident angle on the sample surface.

In the case of evaluating the crystal orientation in the in-plane direction, in-plane rotation (φ scan) of the sample is performed, but in the case where the sample surface is tilted as shown in FIG. 1A, controlling an incident angle of X-ray on the sample and a swing of the sample according to the movement of φ during measurement thereof is performed in such a manner that the incident angle is not changed as shown in FIG. 1B. Evaluating the crystal orientation of GaN (1-100) c axis-grown according to the present invention is carried out by the following procedures.

First, in order to perform the rocking curve measurement (φ scan) of GaN (1-100), setting the measurement arrangement of GaN (1-100) is made (incident angle ω0: 0.5°, 2θχ:32.5°). Next, a GaN epitaxial thin film is arranged on a sample plate to adjust height of the sample (corresponding to step S1). Then, the premeasurement is performed using total reflection of X-rays incident on the GaN surface (corresponding to steps S2 and S3). An inclination α of a normal line to a sample surface from a φ axis, and an azimuth (azimuth angle) β thereof are acquired by the premeasurement. The adjustment amounts of the ω value and the χ value with respect to the φ value are calculated based on the acquired inclination α and the azimuth (azimuth angle) β (corresponding to step S4). The drive control values with respect to the incident angle ω0 are calculated using the calculated adjustment amounts, and are stored (corresponding to step S5). At this time, displaying the virtual RxRy, or the inclination angle and the azimuth angle may be made (corresponding to step S6).

Next, an instruction for performing the rocking curve measurement is given by moving to the measurement arrangement of GaN (1-100) (corresponding to step S7). The stored calculation expressions are read by receiving the instruction (corresponding to step S8). Then, X-ray irradiation is performed to conduct simultaneous control of the drive axes during the φ scan (corresponding to steps S9 and S10). In this manner, the azimuth of GaN (1-100) with respect to the sample outer shape can be determined from the resulting peak position.

In the above-described example, the invention is applied to the rocking curve measurement (φ scan) out of the in-plane diffraction measurement, but can also be applied to an in-plane XRD measurement (2θχ/φ scan) in which simultaneously scanning 2θχ and φ is performed at a relative speed of 2:1; and a pole figure measurement using an in-plane axis, in which φ scan is performed while changing arrangement of a goniometer.

EXPLANATION OF THE SYMBOLS

5 System
6 X-ray generation section
7 Incident side optical unit
7a Paraboloid multilayer mirror
7b Soller slit
8 Five-axis goniometer
9 Outgoing side optical unit
10 Detector
12 Head part
14 Base part
15 χ cradle (χ axis adjustment mechanism)
18 Sample stage
21 θs rotation drive apparatus
22 θd rotation drive apparatus
23 2θχ rotation drive apparatus
26 χ rotation drive apparatus
27 φ rotation drive apparatus
28 CPU
29 Memory
30 X-ray diffractometer
32 Keyboard
33 X-ray intensity calculation circuit
34 Display
40 Control apparatus
41 Input section
43 Adjustment amount determination section
45 Storage section 46 Off angle calculation section
47 Drive instruction section
F X-ray source
S0 Sample
n Normal line to surface
Δχ Adjustment amount
Δω Adjustment amount

The invention claimed is:

1. A control apparatus that controls a tilt of a sample, the control apparatus comprising:
a processor and a storage storing a program that causes the processor to:
receive an input of inclination information representing inclination of the sample with respect to a ϕ axis;
determine adjustment amounts of a ω value and a χ value for correcting a deviation amount between a scattering vector and a normal line to a sample surface or a lattice plane with respect to a ϕ value that varies, using the inclination information;
drive a goniometer according to ϕ axis rotation of the sample, based on the determined adjustment amounts of the ω value and the χ value, during an X-ray diffraction measurement; and
drive the goniometer to rotate about a ω axis and rotate about a χ axis based on the adjustment amounts of the ω value and the χ value along with the ϕ axis rotation while matching the scattering vector with the normal line to the sample surface or the lattice plane during the X-ray diffraction measurement.

2. The control apparatus according to claim 1,
wherein the goniometer has three or more rotation axes that are simultaneously drivable, and the processor drives the goniometer using the three or more rotation axes.

3. The control apparatus according to claim 1, wherein the program further causes the processor to store, in the storage, the adjustment amounts of the ω value and the χ value with respect to the ϕ value that varies, as calculation expressions for χ and ϕ axis driving,
wherein the processor drives the goniometer based on the stored calculation expressions for χ and ϕ axis driving.

4. The control apparatus according to claim 1, wherein the program further causes the processor to store, in the storage, a correspondence relation of adjustment values of the ω value and the χ value with respect to the ϕ value that varies, as a table, according to the inclination information,
wherein the processor determines the adjustment values of the ω value and the χ value, based on the correspondence relation in the stored table.

5. The control apparatus according to claim 1, wherein the program further causes the processor to calculate an off angle between the lattice plane and an outer shape surface of the sample, based on the adjustment amounts of the ω value and the χ value.

6. The control apparatus according to claim 1,
wherein the X-ray diffraction measurement is an in-plane XRD measurement, an in-plane pole figure measurement with 2θχ axis, a rocking curve measurement, an out-of-plane measurement or a reciprocal space mapping.

7. The control apparatus according to claim 1,
wherein the processor determines the adjustment amounts of the ω value and the χ value at every measuring position on an XY stage placed on the goniometer, and the processor performs an instruction for driving the goniometer in accordance with the ϕ axis rotation of the sample at the every measuring position on the XY stage, based on the determined adjustment amounts.

8. A system comprising:
the control apparatus according to claim 1, and
an X-ray diffractometer constituting an optical system for irradiating incident X-rays to the sample and detecting X-rays diffracted from the sample, the X-ray diffractometer including an X-ray generation section that generates X-rays from an X-ray focus, an incident side optical unit, and a five-axis goniometer that measures an angle for a sample in the optical system and a detector in a point region,
wherein the goniometer having three or more rotation axes that are simultaneously drivable is driven by the control apparatus.

9. The control apparatus according to claim 2,
wherein the three or more rotation axes comprise the ϕ axis, a χ axis, and a ω axis.

10. The control apparatus according to claim 9,
wherein the ω axis is controlled by using a θs axis and a θd axis in combination as two drive axes, the θs axis being a rotation axis for controlling an incident angle of X-ray, and the θd axis being a rotation axis for controlling a receiving angle of X-ray.

11. A method of controlling a tilt of a sample, the method comprising the steps of:
receiving an input of inclination information representing inclination of the sample with respect to ϕ axis;
determining adjustment amounts of a ω value and a χ value for correcting a deviation amount between a scattering vector and a normal line to a sample surface or a lattice plane with respect to a ϕ value that varies, using the inclination information;
driving a goniometer according to ϕ axis rotation of the sample, based on the determined adjustment amounts of the ω value and the χ value, during an X-ray diffraction measurement,
driving the goniometer to rotate about a ω axis and rotate about a χ axis based on the adjustment amounts of the ω value and the χ value along with the ϕ axis rotation while matching the scattering vector with the normal line to the sample surface or the lattice plane during the X-ray diffraction measurement.

12. A non-transitory computer readable recording medium having recorded thereon a program for controlling a tilt of a sample, the program causing a computer to execute the processes of:
receiving an input of inclination information representing inclination of the sample with respect to a ϕ axis,
determining adjustment amounts of a ω value and a χ value for correcting a deviation amount between a scattering vector and a normal line to a sample surface or a lattice plane with respect to a ϕ value that varies, using the inclination information;
driving a goniometer according to ϕ axis rotation of the sample, based on the determined adjustment amounts of the ω value and the χ value, during an X-ray diffraction measurement,
driving the goniometer to rotate about a ω axis and rotate about a χ axis based on the adjustment amounts of the ω value and the χ value along with the ϕ axis rotation while matching the scattering vector with the normal line to the sample surface or the lattice plane during the X-ray diffraction measurement.

* * * * *